United States Patent [19]

Hicks et al.

[11] Patent Number: 4,872,056
[45] Date of Patent: Oct. 3, 1989

[54] METHOD FOR DISPLAYING SELECTED HAIRSTYLES IN VIDEO FORM

[75] Inventors: T. Lawrence Hicks, Caldwell; Guy M. Givens, Star; Robert J. Brinton, Eagle; Donald J. Grundhauser, Boise, all of Id.

[73] Assignee: Video Graphic Styling, Inc., Caldwell, Id.

[21] Appl. No.: 10,971

[22] Filed: Feb. 5, 1987

[51] Int. Cl.[4] .......................................... H04N 5/272
[52] U.S. Cl. ...................................... 358/183; 358/22; 358/182
[58] Field of Search .................. 358/183, 182, 181, 22, 358/93; 434/94

[56] References Cited

U.S. PATENT DOCUMENTS

| | | | |
|---|---|---|---|
| 4,261,012 | 4/1981 | Maloomian | 358/183 |
| 4,297,724 | 10/1981 | Masuda | 358/183 |
| 4,467,349 | 8/1984 | Mallomian | 358/93 |
| 4,539,585 | 9/1985 | Spackova | 358/183 |
| 4,602,280 | 7/1986 | Maloomian | 358/183 |
| 4,731,743 | 3/1988 | Blancato | 358/93 |

FOREIGN PATENT DOCUMENTS

| | | | |
|---|---|---|---|
| 1020276 | 11/1977 | Canada | 358/22 |
| 46671 | 4/1980 | Japan | 358/22 |
| 68784 | 5/1980 | Japan | 358/22 |
| 46590 | 3/1982 | Japan | 358/22 |

Primary Examiner—Tommy P. Chin
Attorney, Agent, or Firm—Noel F. Heal

[57] ABSTRACT

A method for realistically combining two separately generated video images, such as of a face and a hairstyle, in such a way that the resulting composite image has a natural appearance. Hairstyle images are captured and processed to include synthesized "fill" hair in addition to real hair. When combined with a face image, the "fill" hair is conditionally displayed, to fill gaps between the hairstyle image and the face image, but not over any portion of a predefined face area. After selection of a hairstyle and combination with the face image, adjustments may be made in position, size and color. A color blending procedure smooths out any sharp edges between hair and face images, and further enhances the natural appearance of the composite image.

18 Claims, 11 Drawing Sheets

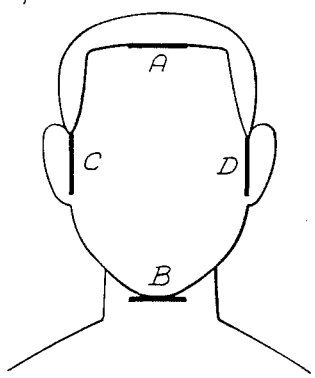
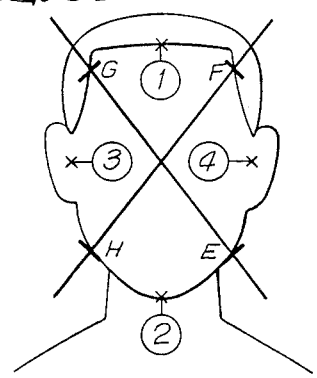
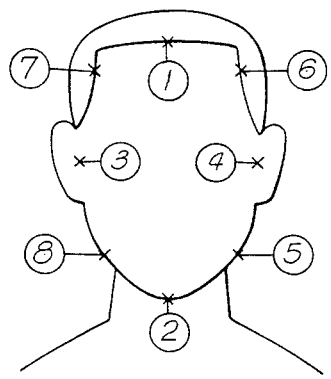
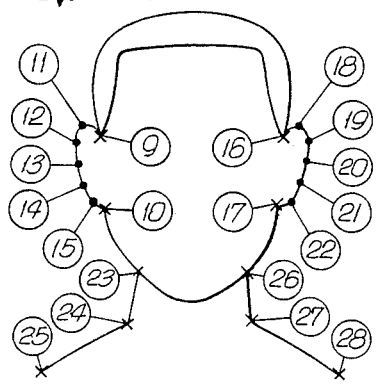
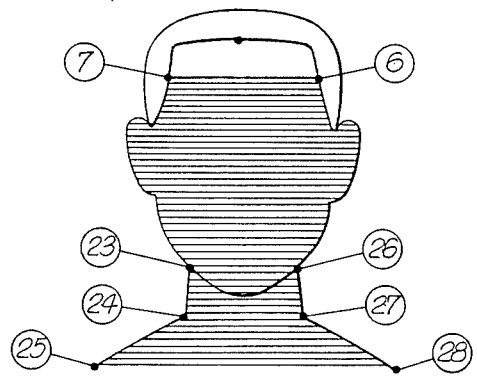

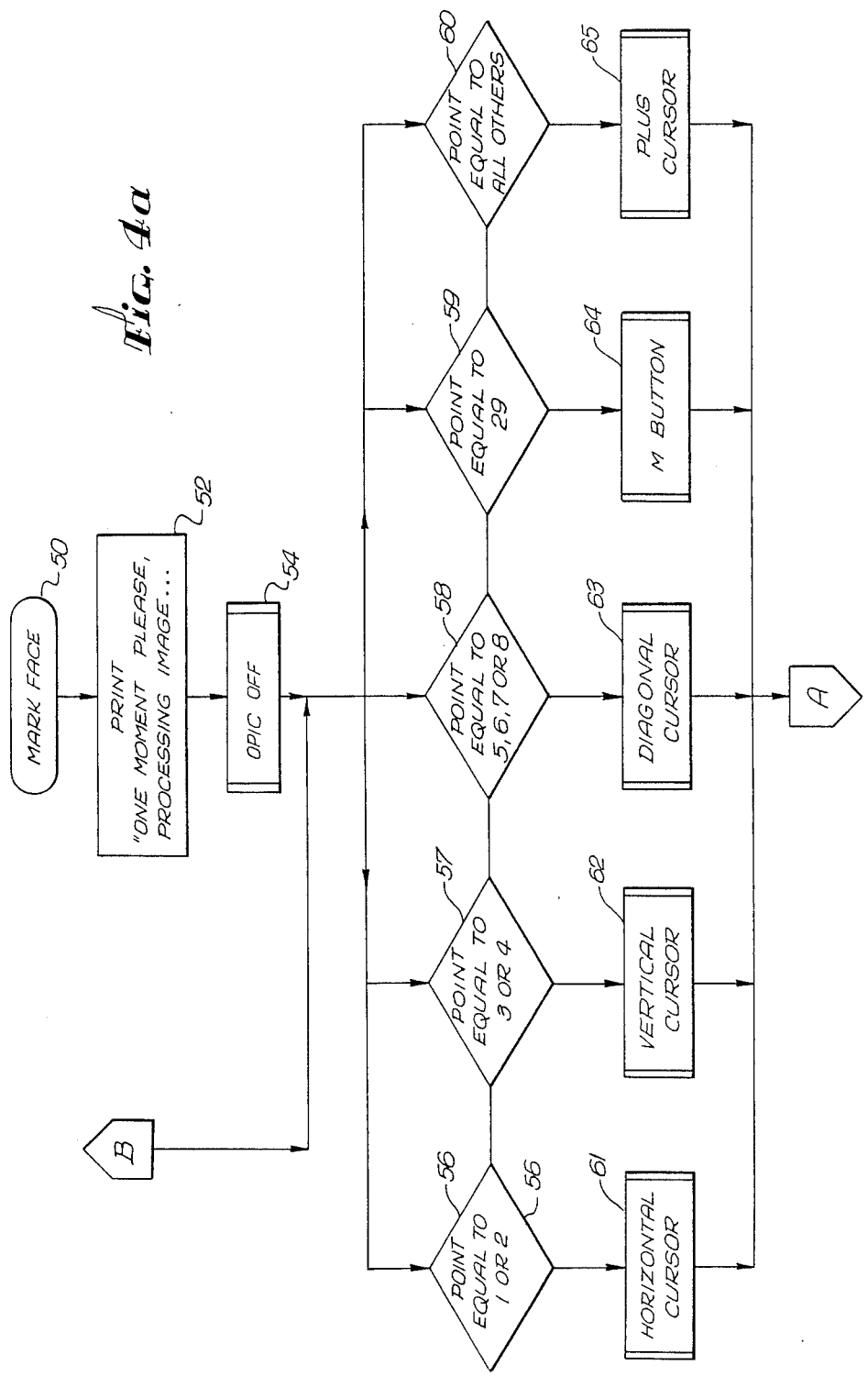

METHOD FOR DISPLAYING SELECTED HAIRSTYLES IN VIDEO FORM

BACKGROUND OF THE INVENTION

This invention relates generally to graphics display systems and, more particularly, to graphics display systems used to combine graphics images from two or more source. The particular problem that the invention addresses relates to the field of hair styling, but it will be apparent as the description proceeds that the invention is equally applicable to other fields, such as cosmetics, clothing fashions, and so forth.

A significant problem for hair stylists, and for their patrons or customers, is the selection of a hairstyle that will look pleasing on a particular person. Some hair stylists simply do not have the artistic ability or the experience to anticipate the results of applying a particular hairstyle to a customer. The customer will typically have even greater difficulty in selecting a hairstyle from photographs and imagining what the effect of the style will be. Because of differences in face shape, facial features, type and color of hair, physical stature, and so forth, a style that looks perfect on a photographed model may be totally inappropriate for the customer.

In the past, the most common approach to solving this problem has been to show the customer photographs of various hairstyles, and to modify a selected style to fit the customer as well as possible. The success of this technique depends heavily on the hairstylist's skill and experience in adapting the selected style to the customer's physical characteristics, and on the degree of communication between the customer and the hairstylist. Frequently, however, the result does not meet the customer's expectations, and there is a significant cost to the customer, the hairstylist, or both.

Various attempts have been made to employ video technology to address this problem. One approach is to use a computer "paint" program that permits the capture of a video image in digitized form, and then the subsequent manual editing of the digitized image to obtain a desired effect. The digitized image is displayed by a computer on a video screen, and the user edits the image by moving a pointer or cursor about the screen, and selecting various commands to change the extent and color of the digitized image. This method is tedious and time-consuming, however. Its use in a hairstyling environment is totally impractical because of the experience and training that would be required of the personnel operating the system.

Another approach that has been proposed employs two video cameras. One is positioned on a picture of a model wearing a proposed hairstyle, and the other is focused on the customer. The model's face is cut from the picture of the hairstyle, which is then electronically overlaid with the customer image. The result is a very artificial "cut and pasted" appearance, with no allowance being made for size differences or different face shapes.

It will be appreciated from the foregoing that there is still a real need for an improved technique for selecting hair styles and, more generally, for adapting video images to be overlaid in such a manner that the resulting composite image has a natural appearance. The present invention fulfills this need.

SUMMARY OF THE INVENTION

The present invention resides in a video processing method and apparatus that permits a selected hairstyle image to be overlaid on a customer image in such a way that the resulting composite image has a natural appearance. An important advantage of the invention is that it is relatively simple to use and requires only a very short period of operator training.

Briefly, and in general terms, the method of the invention comprises the steps of capturing the video image of at least one hairstyle, processing the captured video image of the hairstyle to render it adaptable to a variety of face sizes and shapes, capturing the video image of a customer's face, and combining the video image of the hairstyle with the video image of the customer's face, in such a manner that the hairstyle image fits naturally about the face image. In the presently preferred embodiment of the invention, the step of processing the hairstyle image includes adding "fill" hair to the image in a region covering a range of size and shape adjustability, and the step of combining the hairstyle image and the face image includes deleting "fill" hair that would otherwise cover the face image. In this way, the hairstyle image is combined with the face image without unnatural gaps between the face and the hairstyle and without unnaturally overlaying the hairstyle over the face.

More specifically, for each pair of corresponding picture elements (pixels) for the two images, the step of combining the images further includes the steps of determining whether the hairstyle image pixel is either real hair, "fill" hair, or neither, and determining whether the face image pixel is within a previously defined face area. Based on these determinations, the remaining steps of the method are: using the hairstyle pixel in the combined image if the hairstyle pixel is of real hair, using the hairstyle pixel in the combined image if the hairstyle pixel is of "fill" hair and the face pixel is not within the face area, and using the face pixel if the hairstyle pixel is of "fill" hair and the face pixel is within the face area, or if the hairstyle pixel is of neither real nor "fill" hair.

The method of the invention may also include the steps of moving the hairstyle image with respect to the face image, and repeating the combining step to be sure that the images have combined without unnatural gaps or overlaying of hair over the face.

One aspect of the invention includes the steps of changing the color of the hairstyle image, and repeating the combining step to be sure that the images have combined without unnatural gaps or overlaying of hair over the face.

Yet another aspect of the invention includes the further step of blending the colors of the hair and face images in a region close to the line where the hair and face images meet. More specifically, the blending step includes selecting a face pixel immediately adjacent to a hair pixel; then, for each primary color, determining the average primary color intensity for the selected pixel and for all pixels adjacent to the selected pixel, and replacing the primary color intensities indicative of the color of the selected pixel with the averaged values of primary color intensities. These steps are repeated to blend the color of all face pixels adjacent to a hair pixel.

It will be appreciated from the foregoing that the present invention represents a significant advance in the processing of video graphics data, especially in the field of hair styling and related activities. Other aspects and advantages of the invention will become apparent from the following more detailed description, taken in conjunction with the accompanying drawings.

BRIEF DESCRIPTION OF THE DRAWINGS

FIGS. 3a–3e are diagrammatic views of a customer face image, showing how the outlines of the facial features are marked and a face area is defined;

FIGS. 4a and 4b together comprise a flow chart of the steps performed by the computer in marking the customer face image;

DESCRIPTION OF THE PREFERRED EMBODIMENT

Figure 1:
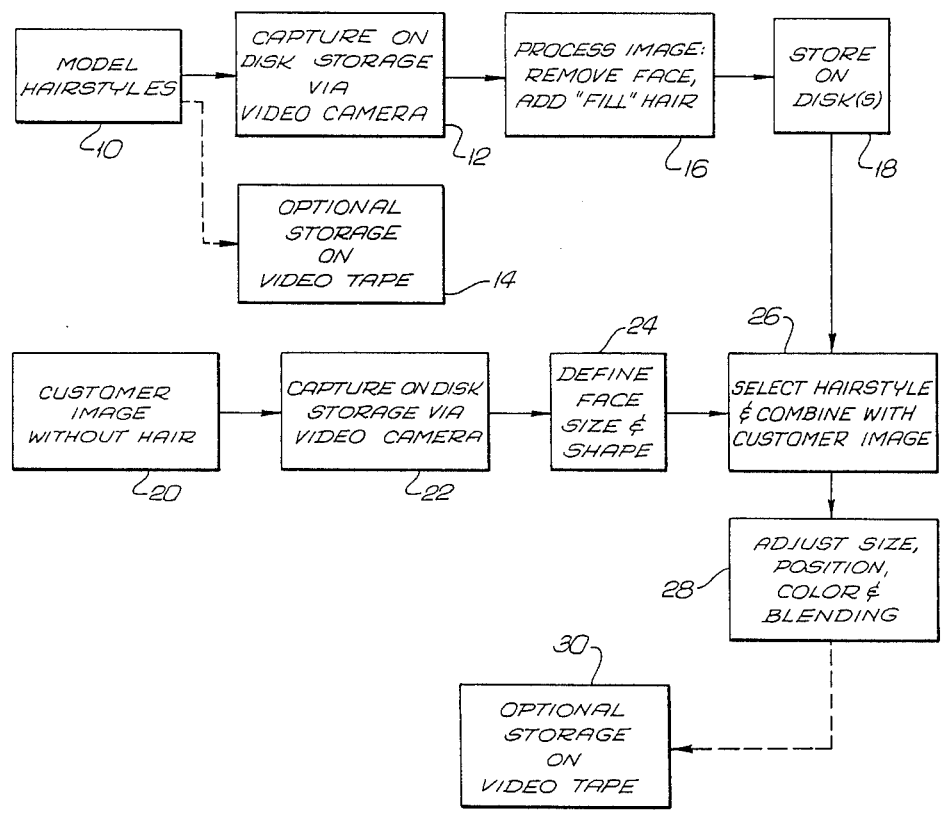
FIG. 1 is a block diagram showing how the information is stored and utilized in accordance with the method of the invention.

Overview of the method:

As shown in the drawings for purposes of illustration, the present invention is concerned with techniques for adapting a selected hairstyle to the video image of a customer's face without unnatural gaps or unnatural placement of the hair over the face. Prior to the invention, video processing of combined multiple images was a time-consuming task requiring a highly experienced operator.

In accordance with the invention, multiple hairstyle images are prepossessed to render them readily adaptable to a variety of face sizes and shapes, and a novel technique is employed for combining a customer image with a selected hairstyle image, without unnatural gaps or hair placement, and without the need for highly experienced personnel. The basic flow of information in this process is shown in FIG. 1.

The success of the invention depends on the preliminary steps of style preparation and customer preparation. Style preparation is, of course, handled without customer participation, and extreme care is taken to prepare images of various hairstyles in such a way that they can be easily adapted to a customer image. Customer preparation should also be performed with great care, but need only be handled once for each customer. When the preliminary steps are carefully performed, the final step of combining a selected hairstyle image with a customer image is effected rapidly and conveniently, such that multiple hairstyles can be adapted to a customer in a matter of minutes.

Model hairstyles, as indicated by reference numeral 10 are captured in video form, using a conventional color video camera, and digitized for storage on a magnetic disk or some other convenient medium, as indicated at 12. The hairstyles are typically modeled by different people, who are placed in a standard and predefined relationship with the video camera while their images are digitized and stored. Optionally, the same images may be stored directly on video recording tape, as indicated at 14, for later viewing by customers. Alternatively, still photographs of the models may be provided to the customer for a selection of hairstyles. The next step, at 16 is one of preprocessing each hairstyle image to make it more easily adaptable to a customer image. This step has two basic components: removing the image of the entire face, neck and shoulders of the model, to leave only the hair, and then adding "fill" hair. A critical problem in adapting a hairstyle for display on multiple customers is that one hairstyle will simply not fit all customers. If the model's face is wider than the customer's, there will be gaps between the hairstyle and the customer's face when the hairstyle image is combined with the customer image. If the model's face is significantly narrower than the customer's, hair may extend across the customer's face to a greater extent than is desired.

Both these problems are solved by the addition of "fill" hair in the hairstyle image. "Fill" hair is a hair image of the same color and apparent texture as the real hair, but it is an image that is synthesized electronically. The "fill" hair is placed at the sides of the U-shaped hairstyle, extending in over the face area. Later, when the hairstyle image is combined with the customer face image, the "fill" hair fills any gaps between the customer face and the real hair of the hairstyle image. Thus, the hairstyle with "fill" can adapt to any face size narrower than the model's. Adapting to a wider face is just as simple. For those cases in which a model's face is thought to be narrow, some of the real hair in the hairstyle can be converted to "fill" hair. As will become clear from the later description, real hair in the style image is always displayed, even if overlapping the face. "Fill" hair is displayed only if is not overlapping the face.

As indicated at 18, the preprocessed hairstyles are saved on a storage medium, such as a magnetic disk, for later use in a hairstyling salon. First, however, the equally important process of customer preparation must be performed. As indicated at 20 and 22, the customer image is captured on magnetic disk in much the same way as the hairstyles. In the case of the customer, however, the object is to capture the face image without any hair. To this end, the customer wears a tight wig cap to draw most of her hair to the rear while being recorded from a nearly frontal position. As indicated at 24, the customer preparation steps are principally concerned with defining the size and shape of the customer's face. As will be explained in detail, the video image of the customer's face is defined by marking a series of points on the outline of the face and ears. Once this is done, the facial area is defined in the stored image. This is the area on which "fill" hair will not be displayed, even if present in the hairstyle image.

As indicated in block 26, the next step is to select a hairstyle from a catalog of those stored on disk, and to combine the selected hairstyle with the customer image. As already mentioned, the basic process employed in the combination step is to display either the hair from the hairstyle image or the face from the customer image, in accordance with a simple set of logical rules. If, for any point on the combined image, there is real hair from the hairstyle, then the real hair is displayed, even if over the face. "Fill" hair is displayed only if not over the face area, and blank areas of the hairstyle image are supplied from the face image.

As shown in block 28, the composite image obtained by combining the hairstyle image and customer image may be adjusted in a variety of ways, including adjustments in size, position, and color. There is also an important option to "blend" the colors of the face with the adjacent hair. This removes the sharp "staircase" edges sometimes associated with the synthesis of graphics images. An optional step, shown at 30, is the storing of the composite customer images on video tape. This helps the customer in her ultimate selection of a hairstyle, since the tape may be taken home for later viewing before a final decision is reached.

Figure 2:
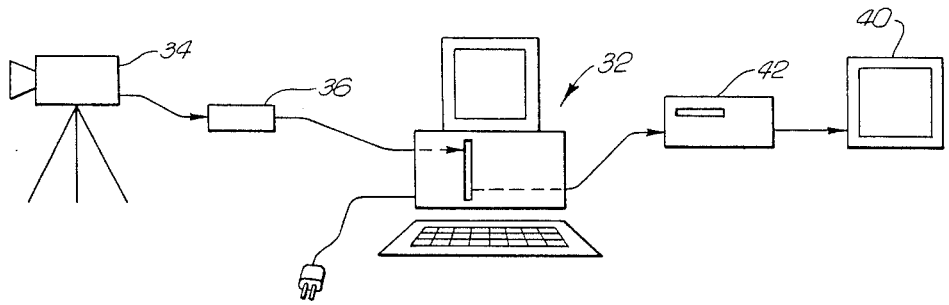
FIG. 2 is a block diagram of the interconnected hardware required for practicing the method of the present invention.

The hardware used in the method of the invention comprises conventional modules that can be purchased "off-the-shelf" for use in this system. A simplified hardware diagram is given in FIG. 2. The heart of the system is a computer 32 compatible with the 16-bit Microsoft disk operating system (MS-DOS), having 640k of random access memory and preferably a hard disk drive as well as a floppy disk drive. The camera 34 and its power supply 36 are of conventional design, coupled to the computer by means of an image capture board (ICB), the one used being manufactured by American Telephone and Telegraph Company (AT & T). The computer is connected to a composite color monitor 40 and, optionally, to a video cassette recorder 42.

The steps described briefly with reference to FIG. 1 will now be discussed in more detail.

Hairstyle preparation

The preparation of hairstyles for inclusion in a catalog for selection by customers can be performed without special-purpose software, since the time taken in this process is not critical. Style preparation is basically an "off-line" function, performed at some site other than the hairstyling salon. The catalog of hairstyles will typically be compiled by the supplier of the hairstyling system, with copies being supplied to hairstylists who are to use the system.

In the presently preferred embodiment of the invention, style preparation is performed by means of a graphics "paint" program called True-vision Image Processing Software (TIPS), manufactured by AT & T, and specifically intended for use with their image capture board. Basically, IPS and other programs like it permit the user to edit captured graphics images, or to create original graphics images in a computer. The editing function, which the method of the invention uses here, allows the user to define, delete or modify areas of the image, and to save the modified images for later use. In effect, TIPS can be thought of as the graphics equivalent of a powerful word processing program.

To capture the hairstyle, the model is placed in front of a brown background and her position is adjusted until her head in the corresponding video image fills predefined image oval. Then the image is captured and digitized for subsequent processing. A preliminary step is to replace all picture elements (pixels) in the image that are absolute white in color with a near-white color. The absolute white color is used to indicate a gap in the hairstyle when the image is later stored, so it is important to eliminate this color from the actual hair. The specific details of the next following steps will depend on the specific editing program being used, but the TIPS terminology is used here by way of example. It will be understood, however, that it is the function being performed that is important to the invention.

The "touch-up" function of TIPS is used to place a white border around the outside of the hair, replacing the blue background. The touch-up function provides a simulated "magnifying glass" effect to permit editing of the image on a pixel-by-pixel basis. The same function is then used to edit out, or remove, the face of the model, including the ears and the flesh tones in the forehead bangs of the hairstyle. At the end of this process, there should be a white border completely around the hairstyle. The next step is to build a mask to protect the hairstyle image from the subsequent steps. In TIPS this is done using the functions "mask" from a special effects menu, then "clear" to clear any prior selection of a mask, and "build" to build the new mask. Building the mask is completed by selecting the "fill" tool twice and then the "boundary" fill function. The system requests that a cursor be placed over the white boundary, and then over the hairstyle area to be protected by the mask, which will then appear as a purple-colored area on the screen.

To use the mask that has been created, the "mask" function is again selected (twice), and then the "use" function. Again the "boundary" and "fill" functions are selected to choose the white border area. The result is to fill the entire area except the masked hairstyle with a solid white color.

The next step is to set an identifying bit in each pixel making up the hairstyle area. This bit is subsequently used to identify real hair in the hairstyle image. In TIPS the identifying bit is set by selecting the special effect "video," which first blacks out the screen, then selecting the sub-menu options "sub" and "video only." Then the tool option "rectangle" is selected twice, and the "filled" option from its sub-menu. When exit is made to the image display, the entire picture area is filled in by defining its upper-left and lower-right corners, leaving the background white once again and the hair area filled with black. When return is made to the TIPS menu and the "video" option is deselected, the hair should reappear on the screen against its now white background.

The final and most important step is to add some extra or "fill" hair to the style image. In TIPS the "tile" function is used to match the "fill" hair as closely as possible to the real hair of the hairstyle. The "tile" function permits the user to select an area of the image that can be copied in color during a subsequent "draw" operation. The user can select a large cursor from a cursor menu, and then select the "draw" tool. "Fill" hair is added using the selected cursor. The "fill" hair is added to the inside region of the hairstyle, to permit it to be more easily adapted to wider customer faces. If necessary, real hair can be changed to "fill" hair using the appropriate editing functions.

As previously noted, the foregoing description is specific to the use of the TIPS package for editing the style image. Any similar editing software could be used for this purpose. The important aspects of processing the style image are that the background is totally removed, i.e. converted to pure white, that "fill" hair is added to the image, and that pixels representing real hair are in some manner tagged for later identification.

The captured hairstyle is complete at this point except for aspects relating to its color. A "COLOR" program analyzes the pixels making up the total hairstyle and determines the average red, green and blue content of the hairstyle. These are stored with the hairstyle to properly characterize its color. Other parameters stored with the hairstyle give its style number and name, and characterize it by face shape, length, and cut type. A color conversion program is available for use at the time the hairstyle is combined with the customer image. Use of this color conversion program depends on the existence of recorded parameters to effect the color changes, together with a copy of the hairstyle in its natural color, prepared as part of the style preparation procedure. Ideally, the color of the hairstyle should be convertable to any of twenty-eight colors, including eight ash colors, eight gold colors, six red colors and six silver colors. Since hair color conversion is a process that defies perfection, it is best performed during style preparation, when trial and error may be used without waste of customer time. The hairstyle may then be stored in as many hair color versions as possible in the style catalog.

Customer Preparation

After style preparation, customer preparation is the second preliminary step for rapid adaptation of selected hairstyles to a customer's face. In customer preparation, the customer wears a tight wig cap to hold her own her hair toward the back of her head, and takes a position facing slightly to one side of center. As in style preparation, an oval shape displayed on the color video monitor is used to align the customer's head properly. Then the image is captured and processed to properly record the face size and shape.

The procedure includes prompts to the operator to record the positions of prescribed points on the customer's facial image. In the first step, a horizontal cursor line appears near the top of the display. The operator positions this line at the hairline on the customer's forehead, as indicated at A in FIG. 3a. For convenience, a computer input device known as a mouse is best employed for movement of the cursor. The mouse is moved across a flat surface and this motion is converted into cursor movement. When the operator wishes to indicate that the appropriate position has been reached, a button is actuated on the side of the mouse. Accurate control is thereby achieved with only one hand, and the actuation of special keys on the keyboard is not needed.

Similar steps are performed to mark the lower extremity of the chin, and the right and left sides of the face, not including the ears, as indicated at B, C, and D, respectively. As shown in FIG. 3b, in the next series of steps, four successive diagonal lines are displayed on the face image, and the operator must position the cursor line at the points of intersection of these diagonal lines and the diagonal extremities of the face, as shown at E, F, G and H. As each point is marked, it is displayed as an X on the screen.

These first eight points defining the facial shape are shown in FIG. 3c by the numerals 1-8 in circles. Next, as shown in FIG. 3d, successive points 9-28 must be marked in sequence by the operator. These are the upper and lower extremities of the right ear, five additional points defining the right ear contour, the upper and lower extremities of the left ear, five additional points defining the left ear, and three points on each side defining the neck and shoulder outline.

After all twenty-eight points on the extremity of the face have been defined, the computer sets an identifying bit in every pixel of the face area, as defined by the shaded area of FIG. 3e. Basically, the face area is defined for this purpose as extending from about the middle of the forehead and down across the ears, neck and visible portions of the shoulders. As mentioned earlier, this defined face area is used to determine whether or not to display "fill" hair. If "fill" hair falls on the face area, it is not displayed real hair is displayed, whether in the face area or not.

Figure 4B:
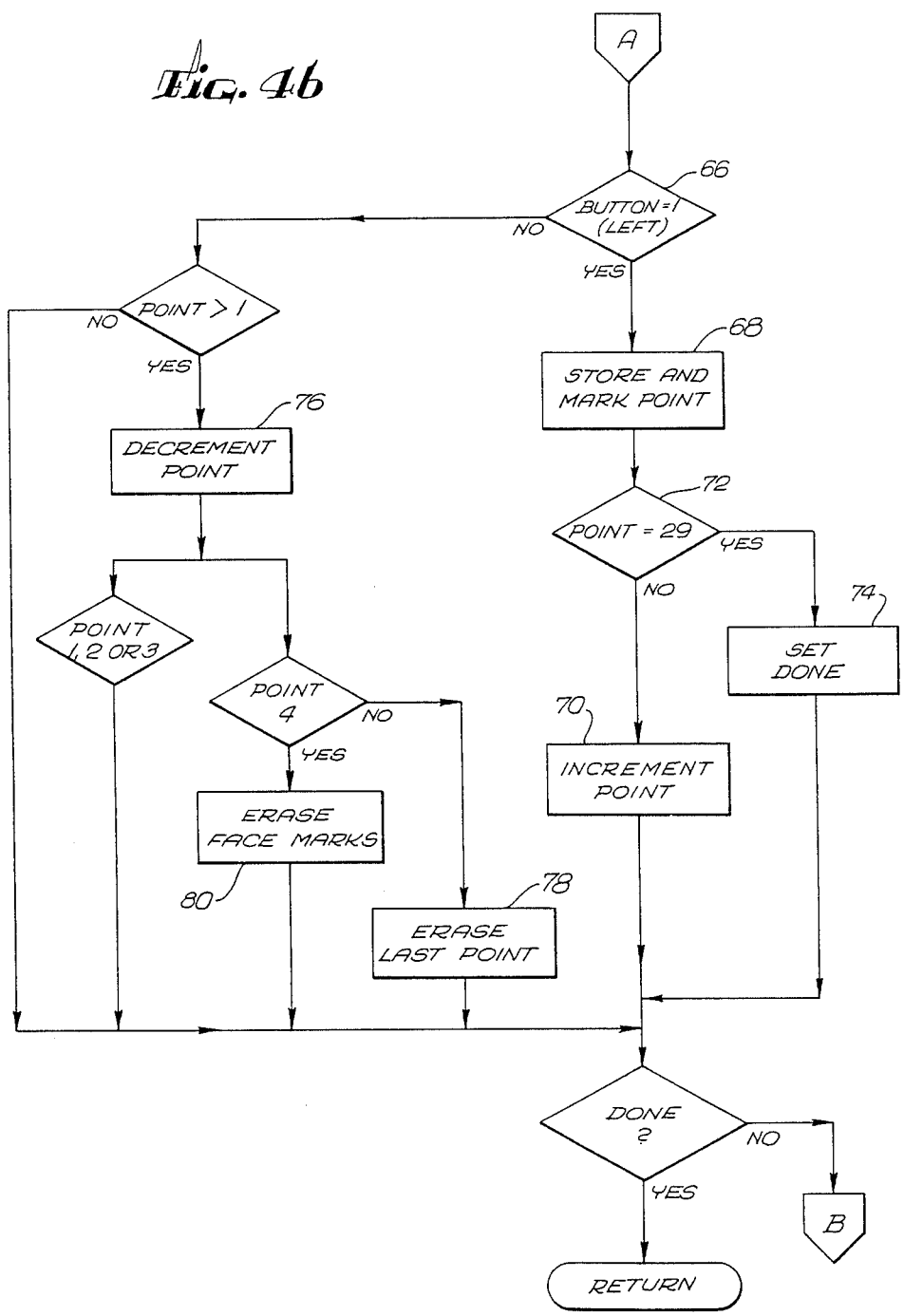

FIGS. 4a and 4b together define a flow chart of the functions performed by the computer in customer image preparation. After entry to the procedure, at 50, a brief operator message is displayed (52), and a subroutine 54 is entered to make sure that the identifying bits in all of the pixels are off. Then, in accordance with a series of decision blocks 56–60, it is determined which of the twenty-eight identifying points is being addressed on the face. For the first two points, a horizontal cursor is selected and displayed, as shown at 61. For the third and fourth points, a vertical cursor is selected, as shown at 62. For the second set of four points, a diagonal cursor is selected, 63. If the point number is 29, all points have been processed (64), and if it is anything else a + cursor is selected for marking the points, as indicated at 65.

After selecting the appropriate cursor, the operator response is processed as in FIG. 4b. As indicated in decision block 66, if the left mouse button is actuated the point is stored and marked (68). Then the point number is incremented (70) unless it is already at 29 (blocks 72, 74). Return is made through connector B if more points are to be processed. If the right button is actuated on the mouse, the point number is decremented (76), and the last point is erased (78), or the last set of points (80) in the case of the four primary face marks.

The identifying bits in the shaded area are then set to define the face area. The boundaries of this area are defined by a sequence of straight lines through the identifying points on the extremities of the face. The purpose of this identifying bit is to prevent the overlaying of "fill" hair in the marked out face area.

Combining the Style and Customer Images

Figure 5A:
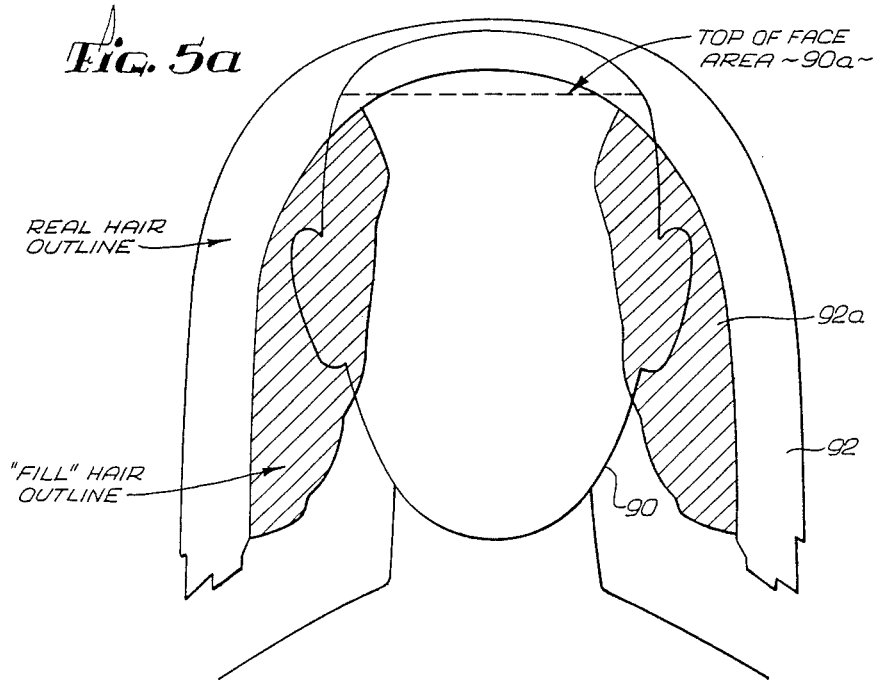
FIGS. 5a and 5b are diagrammatic views illustrating how a selected hairstyle image and a customer face image are logically combined.
Figure 5B:
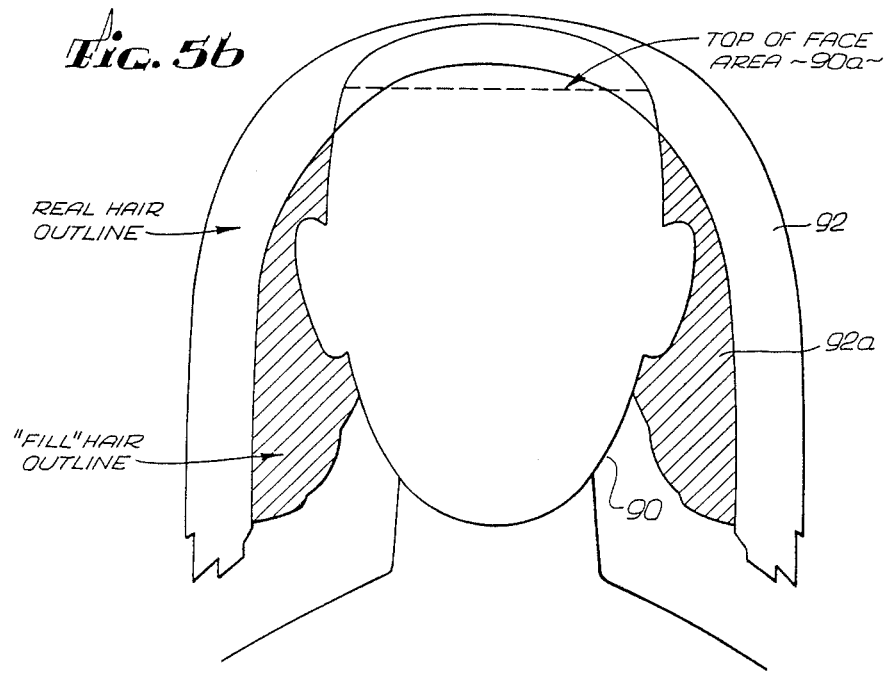

The key to efficient combination of the customer image with a selected hairstyle is preparation of the hairstyle to define an appropriate region of "fill" hair, and preparation of the customer image to define the face area as precisely as possible. FIGS. 5a and 5b show the process diagrammatically. In FIG. 5a, all the relevant areas are shown, including a customer face outline 90 with a face area defined by the shaded area 90a, and a hairstyle outline 92 with "fill" hair 92a. FIG. 5b shows how these images are combined to apply the hairstyle image to the customer face image. Note that the real hair portions of the hairstyle 92 are displayed, even where they overlap the face region 90a. The "fill" hair 92a is displayed only in those regions where it does not overlap the face area 90a.

Figure 6:
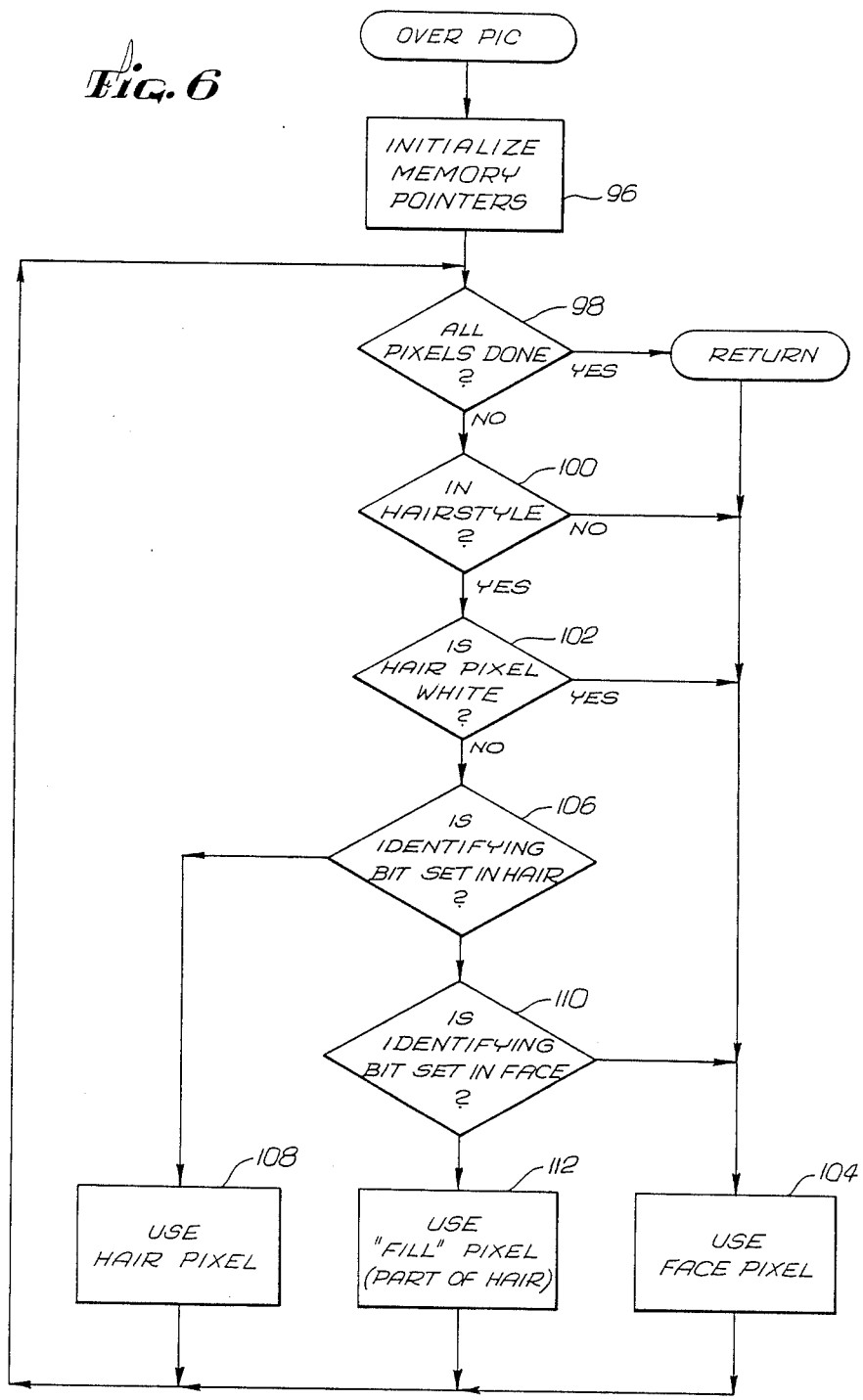
FIG. 6 is a flow chart showing the steps performed in combining a hairstyle image and a customer image.

FIG. 6 shows the functional steps performed by the computer in combining the two images in this way. First, at block 96, memory pointers are initialized to permit all of the pixels to be examined in a scan sequence. In block 98, the question is posed whether all the pixels have been processed. If they have, exit is made from the program. If not, the next question posed, in block 100, is whether the pixel being considered is "within the hairstyle." This test can be used to shorten the processing time by previously defining a "window" or field of view that excludes a large part of the background of the customer image, so that those excluded portions do not have to be processed pixel by pixel.

If the pixel under consideration is within the hairstyle window, the next question posed, at block 102, is whether the pixel is pure white. If it is, the pixel is neither hair nor "fill" and the corresponding face pixel can be used in the composite image, as indicated at 104. If the hair pixel is not pure white, a check is made in block 106 to determine if its identifying bit is set. If so, the pixel represents real hair and the hair pixel is used in the composite image, as indicated at 108. If the identifying bit is not set, the hair pixel under consideration is "fill" and the question next asked, in block 110, is whether the identifying bit is set in the face area If it is, the pixel under consideration is "fill" hair but overlaps the predefined face area. Therefore, the face pixel is used in the composite image. If the "fill" pixel does not fall on the face area, it is displayed in the composite image, as indicated at 112.

All pixels in the hairstyle window are processed in this manner until the composite image of the hairstyle and the customer's face is complete. The entire process only takes a few seconds to display on the screen, and the composite image is then ready for various adjustments that may be needed to further enhance the image.

Size and Position Adjustments

Once the image of the selected hairstyle is displayed with the customer image, it may be desirable to adjust the hairstyle size to better fit the customer's face. In the present embodiment of the invention, it is possible to expand or contract the hairstyle size either horizontally or vertically, i.e. to make it look wider, narrower, shorter or taller in size. The composite image consists of 51,200 pixels arranged in 200 rows of 256 pixels each. The user indicates where expansion of contraction is desired by moving an X cursor to the position at which a change is to be made. For example, if the cursor is placed to the right of center and widening is indicated, the portion of the hairstyle to the outside of the X will be made wider. The technique employed in each case is to add a duplicate row or column of pixels to lengthen or widen the image, and to delete a row or column to shorten or narrow the image. The hairstyle is sufficiently random in appearance that the addition of a duplicate row or column does not detract from the natural appearance of the hair. Deleted rows or columns are retained in a memory for possible reinsertion. Similarly, the program keeps track of the points at which deletions and insertions occurred, so that these actions can be undone if necessary.

Although the present embodiment has been limited, for simplicity, to the expansion and contraction in horizontal and vertical directions, other possibilities are contemplated, such as expansion and contraction in any direction defined by the operator, using cursor lines on the screen.

Adjustment of the position of the hairstyle image is a relatively simple procedure. After the move function has been selected, a cursor is positioned at the desired new center location of the hairstyle, and the move is initiated. When a hairstyle is moved to one side of the face image, previously suppressed "fill" hair may be displayed to fill the larger space between the style and the face, and previously displayed "fill" on the other side of the face may be suppressed instead of overlaying the face. In other words the images are recombined in accordance with the previously explained rules for displaying "fill" hair.

Color Conversion

By way of background, it should be noted that an image displayed from the digitized output of an image capture board is different in some respects from the same image displayed directly onto a color monitor from a video camera. The color signals from a video camera are typically analog signals, i.e. they have a practically infinite number of gradations in intensity or level. As is normal in color video signals there are three primary color signals indicative of the red, blue and green content of the image. Red, green and blue electron guns in the monitor that are controlled by these three color signals, and these determine the color of each displayed pixel as the electron beams are scanned across the screen. In the image capture board, the red, green and blue signals are treated as separate signals and are converted into digital signals 256 times as each row is scanned. Each conversion of the three signals provides the information for one pixel of the image, and each converted signal is expressed on a scale from 0 to 31, 0 being the darkest end and 31 the brightest end of the scale. Thus, each pixel is stored in the computer as three digital numbers between 0 and 31. The image capture board also converts the digital quantities back into analog signals and passes them to the color monitor for display.

To categorize the hairstyles by color, all of the pixels in the hairstyle area may be averaged together to provide average numbers representative of their red, green and blue content For example, light blondes average 20 for red, 14 for green and 10 for blue. Black hairstyles average 3.5 for red, 2.5 for green and 2 for blue. A brown hairstyle halfway between these two would be at about 12 for red, 8 for green and 6 for blue.

One object of the invention is to be able to display any hairstyle in the database or catalog in any of 28 predefined hair colors. The base hair colors are natural (the color of the original hairstyle), ash, gold, red and silver. The ash colors are further categorized as pastel blonde, light ash blonde, medium ash blonde, dark ash blonde, light brown, medium brown, dark brown and black. The gold colors include pale blonde, light gold blonde, medium gold blonde, dark gold blonde, light gold brown, medium gold brown, dark gold brown and deep gold brown. The red colors include light red blonde, medium red blonde, dark red blonde, light red brown, medium red brown and dark red brown. Finally, the silver colors include silver, pearl, platinum, light slate, medium slate and dark slate. It will be understood that these color names are relative and somewhat subjective terms. Nevertheless, quantitative definitions are possible, using gradations of the average primary color intensities.

The difficulty of converting from one hair color to another by manipulation of the digital color signals is illustrated by the following table, which shows the red levels for three hair colors:

|  | Blonde | Brown | Black |
| --- | --- | --- | --- |
| Brightest pixel | 31 | 20 | 10 |
| Average pixel | 20 | 12 | 3.5 |
| Darkest pixel | 9 | 4 | 0 |
| Range | 22 | 16 | 10 |

The difficulty lies in the extreme difference in ranges between the blonde and black hair colors. If one attempts to effect a conversion from black to blonde by adding an offset of 16.5 to each pixel, the average of the pixels will be increased from 3.5 to 20, but the range of the converted pixels will still be only 10, less than half the range for true blonde hair. Another approach for converting the black hair to blonde would be to multiply each pixel by a "range" factor of, in this case, 20/3.5. The following table compares the two approaches for color conversion:

| Offset method (pixel + offset) | Range method (pixel × ratio of averages) |
| --- | --- |
| 3.5 + 16.5 = 20 | 3.5 × (20/3.5) = 20 |
| 2 + 16.5 = 18.5 | 2 × (20/3.5) = 11.4 |
| 3 + 16.5 = 19.5 | 3 × (20/3.5) = 17.1 |
| 4 + 16.5 = 20.5 | 4 × (20/3.5) = 22.9 |
| 5 + 16.5 = 21.5 | 5 × (20/3.5) = 28.7 |
| 6 + 16.5 = 22.5 | 6 × (20/3.5) = 34.3 |
| 7 + 16.5 = 23.5 | 7 × (20/3.5) = 40 |

Note, however, that the last two entries using the range method is that the converted pixel values exceed the maximum of 31.

The difficulties of using either method have been resolved by using a combination of the two. For example, with an offset value of 10 and a range value of 10, the same color conversion gives the following results:

| (Pixel × (ratio of averages)) + offset |
| --- |
| (3.5 × (10/3.5)) + 10 = 20 |
| (2 × (10/3.5)) + 10 = 15.4 |
| (3 × (10/3.5)) + 10 = 18.6 |
| (4 × (10/3.5)) + 10 = 21.4 |
| (5 × (10/3.5)) + 10 = 24.3 |
| (6 × (10/3.5)) + 10 = 27.2 |
| (7 × (10/3.5)) + 10 = 30 |

The determination of the appropriate offset and range values is still largely a trial and error process, performed as part of the style preparation phase. Different styles use different combinations of these values and, if each hairstyle is to be used in any of the 28 defined colors in general 28 sets of offset and range values will be required. It should be understood, also, that different offset and range values will be required for each of the three primary colors. Visual comparison is used to determine when the conversion has been properly made. If no satisfactory conversion can be made, the closest available color will be substituted for the user at the time that such a conversion is requested. If no satisfactory substitute is available, the natural color of the hairstyle will be substituted.

Figure 7A:
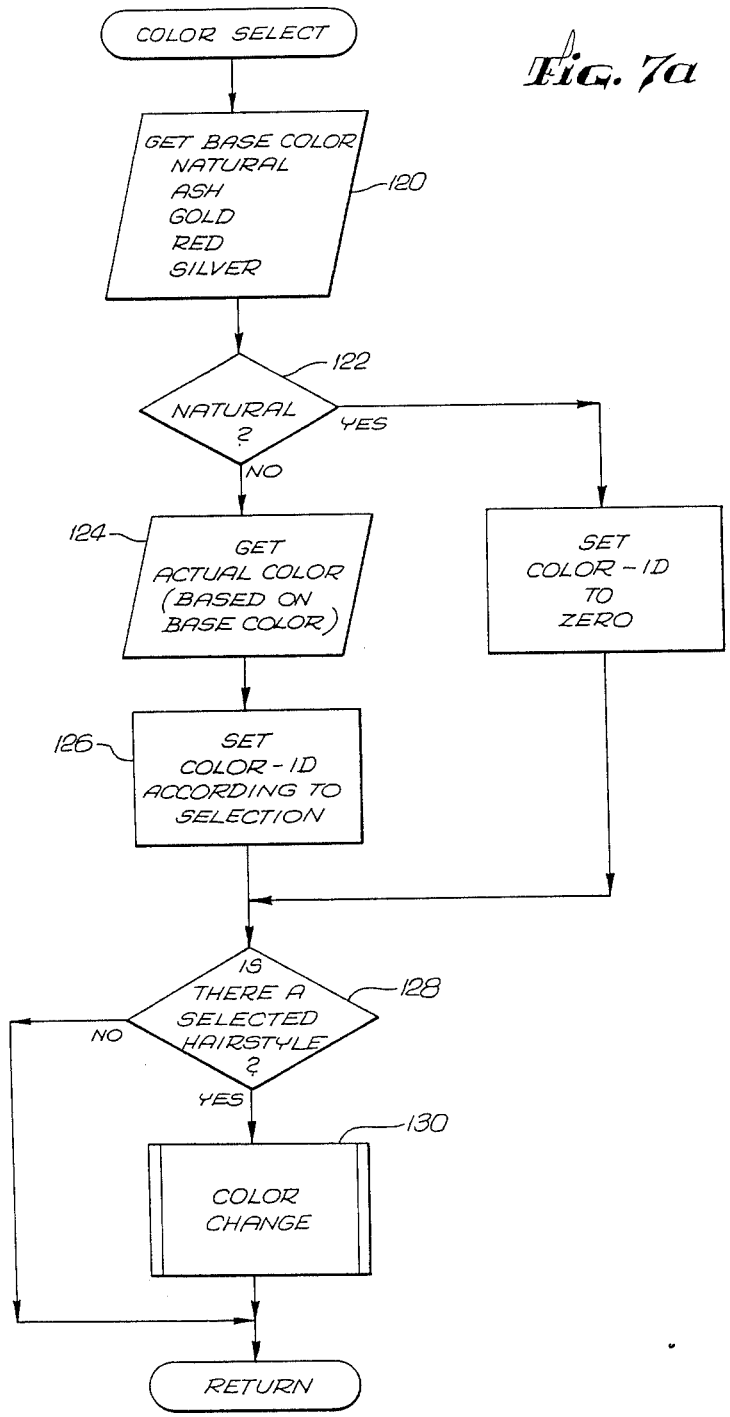
FIGS. 7a–7d are flowcharts illustrating the color selection and color conversion functions.

The functions of color selection and color conversion are defined more specifically in the flowcharts of FIGS. 7a-7d. In FIG. 7a, the first step in color selection is selection of a base color, in block 120. The base color may either be natural (the color of the original hairstyle), or ash, gold, red or silver. If the selection is the natural color, as determined in block 122, the color identifier is set to zero; otherwise it is set to indicate the base color selection, in block 124, and then the selected color identifier within the selected base color, as indicated in block 126. If there is no selected hairstyle currently, as determined in block 128, immediate return is made from the color selection program. If there is a selected hairstyle, entry is made to the color change program (130) before exiting the program.

Figure 7B:
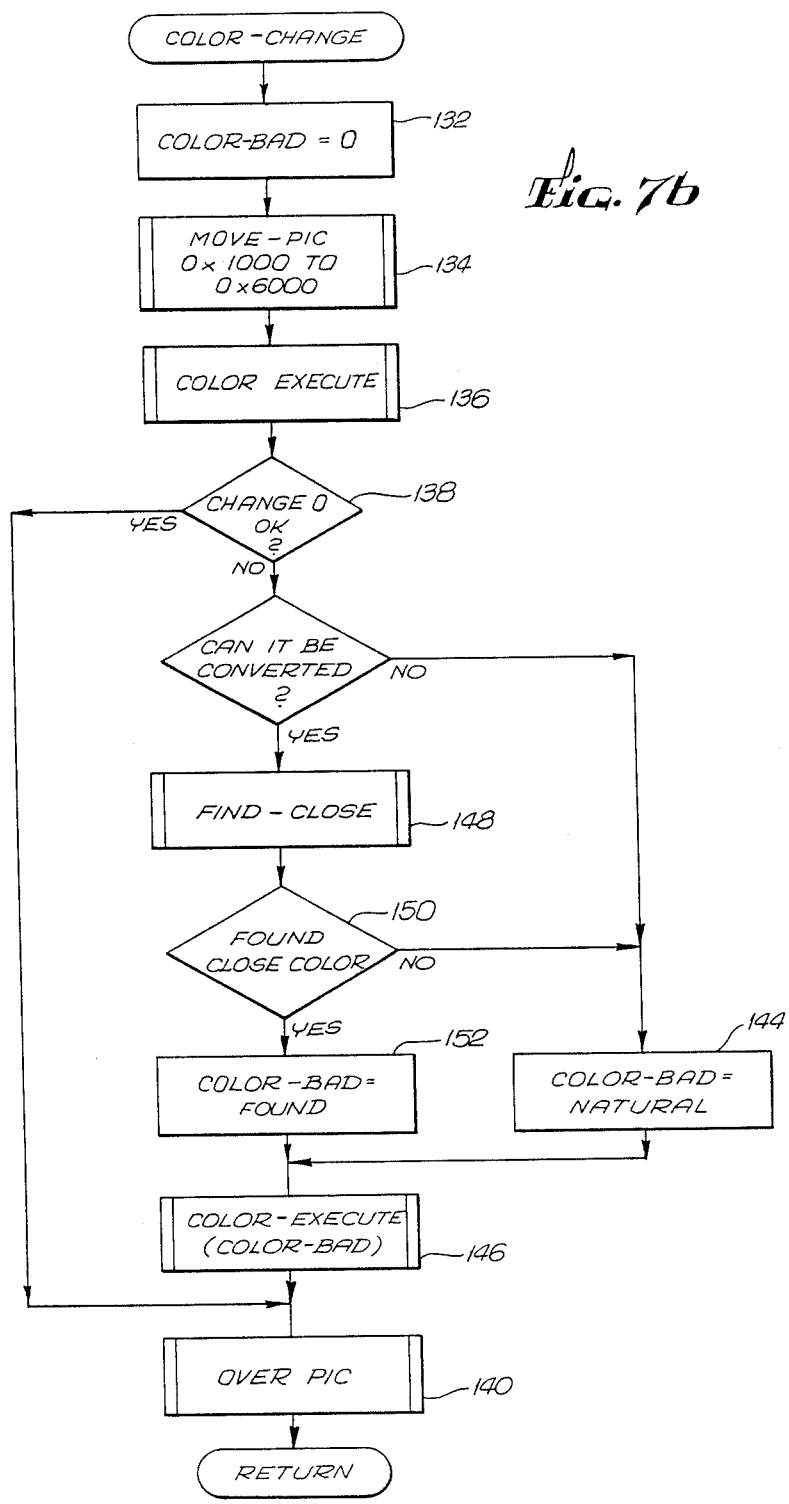

The color change program 30 is shown in greater detail in FIG. 7b. First, a color-bad flag is set to zero, in block 132, and a pixel housekeeping move is made of the pixels, in block 144. Then the color execute program 136 is entered, the details of which will shortly be explained, and a subsequent check is made, in block 138, to determine whether the conversion was successful. If so, the normal path is to the block labelled OVERPIC (140), which was explained with reference to FIG. 6. This recombines the color-converted hairstyle and customer images for display as a composite image.

If the conversion was not successful, the question next posed, in block 142, is whether a successful conversion is possible. If the answer is in the negative, the natural base color is selected, in block 144, and the color execute program is entered at block 146, after which the OVERPIC program 140 is entered as before. If conversion is possible, a search is made for a close color, in block 148. If one is found, indicated in block 150, it is selected as the base color (152) and the color execute program is entered at block 146. If no close color is found, the natural color is selected in block 144.

Figure 7C:
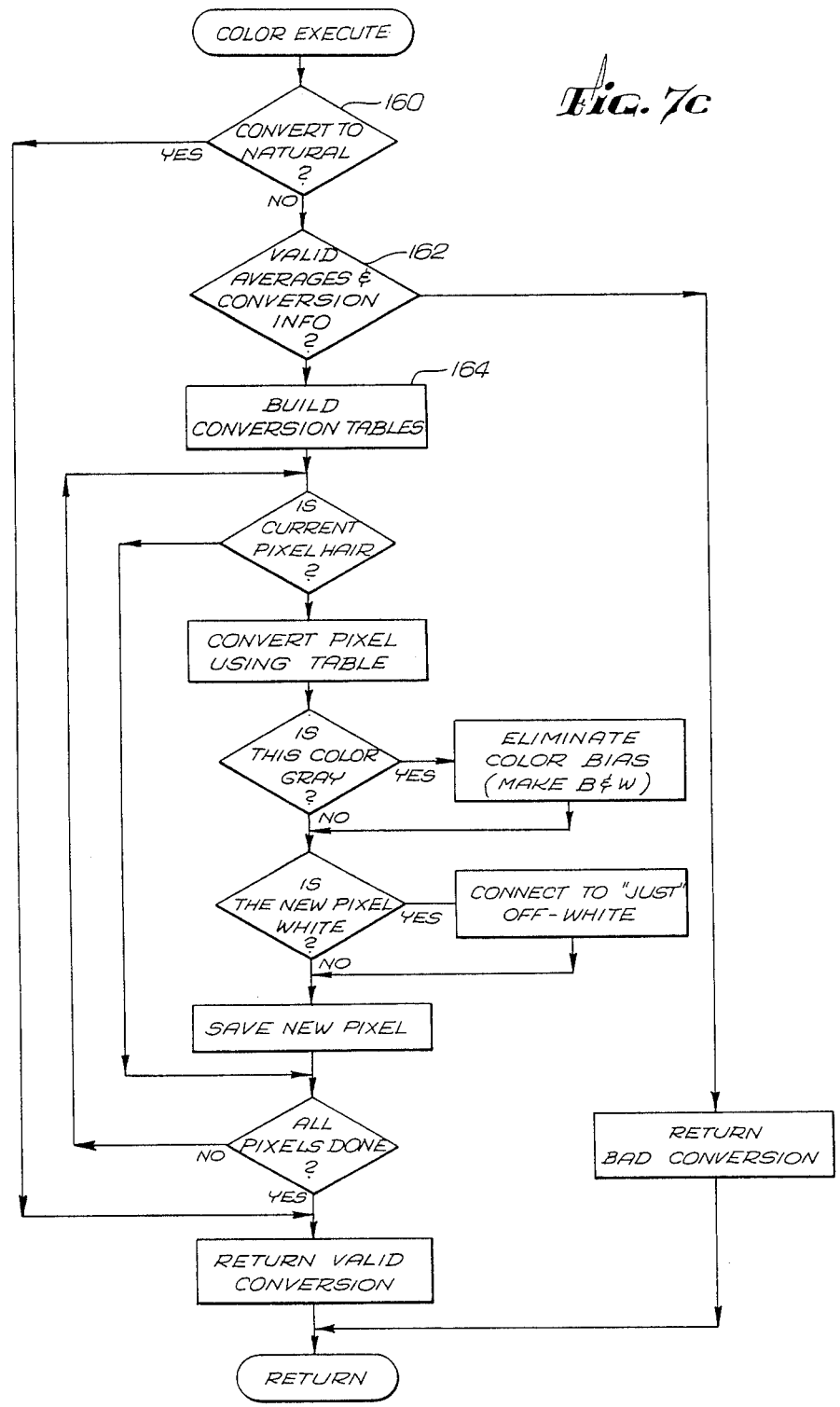

The color execute program is shown in more detail in FIG. 7c. First, if the conversion is to the natural color, determined in block 160, no conversion is required and an exit is made from the program to indicate a valid conversion. If the selected color is not natural, a check is made in block 162 to determine whether valid averages and conversion information exists for this conversion. If not, a return is made from the program with an indication of a bad conversion. If valid information for the conversion exists, the next step, at block 164 is to build the appropriate conversion tables. The remaining blocks in the flowchart examine each pixel and make the conversion according to the conversion tables constructed in block 164. Basically, there are three tests performed on each pixel. First, before conversion the pixel is tested to determine if it represents hair. If it does not represent hair it is not converted. Second, after conversion, if the color selected is a gray shade, i.e. it contains equal levels of red, green and blue, the converted value must be forced to be a gray shade also, and not colored in any respect. Finally, and also after conversion, if the hair pixel is pure white, it is changed to an off-white color to avoid confusion with gaps in the hairstyle.

Figure 7D:
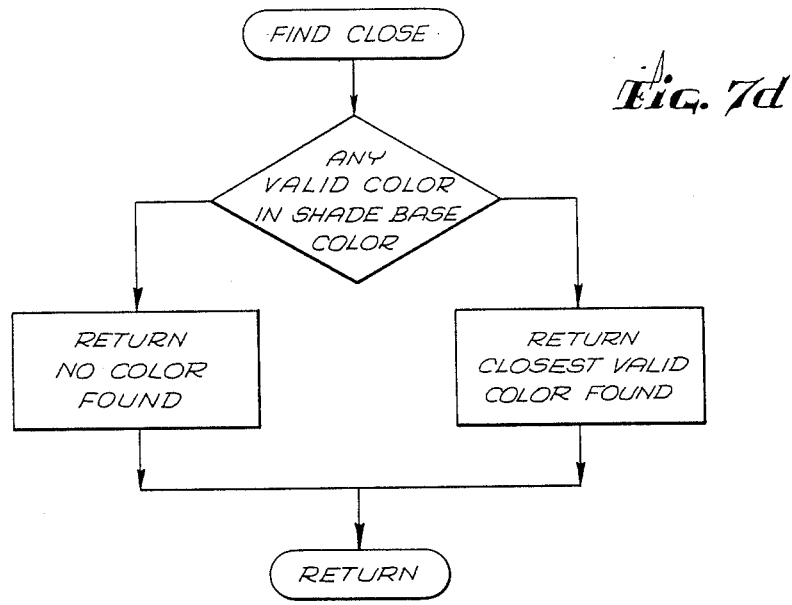

The find-close routine shown in FIG. 7d locates a possible closest color if one exists. It either returns the closest valid color to the one selected, or returns no color.

Color Blending of the Composite Image

Whenever a selected hairstyle is combined with a customer face image as discussed in detail above, there may be sharp or disjointed boundaries between the face and hair pixels. The color blending process smooths out these boundaries and gives the displayed image a much more natural appearance, rather than a "computer-generated" look.

Figure 8A:
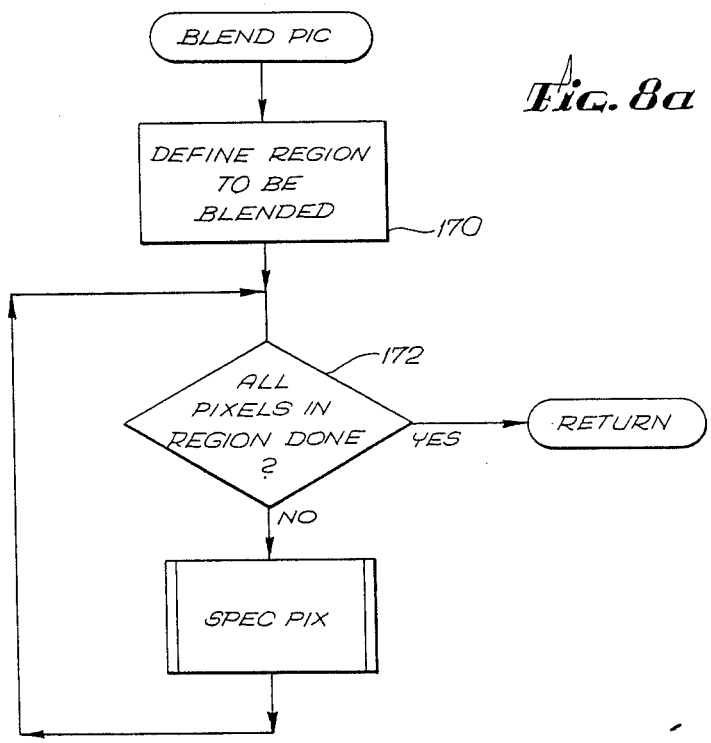
FIGS. 8a–8c are flowcharts showing the steps performed in color blending a customer image and a hairstyle image.
Figure 8B:
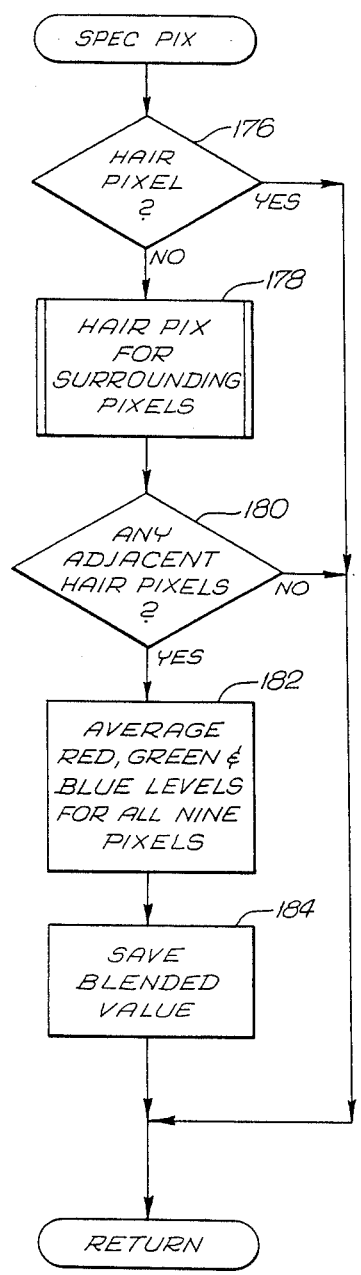
Figure 8C:
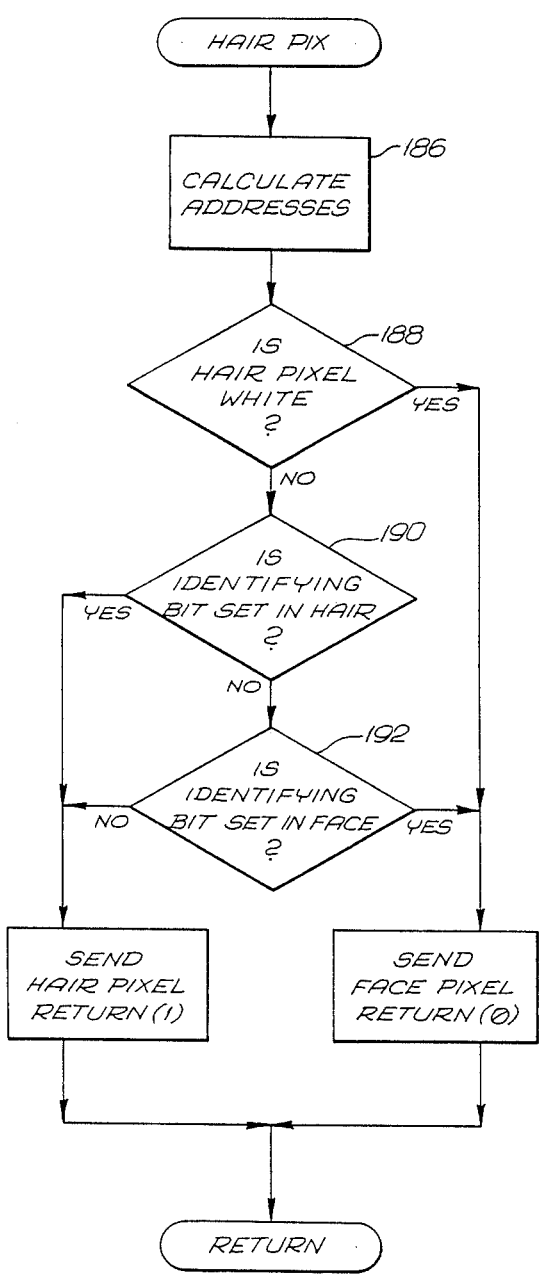

The blending process is illustrated in FIGS. 8a-8c. The basic flow, shown in FIG. 8a, includes first defining the region to be blended, as indicated in block 170, then determining whether all the pixels have been processed, in block 172. If they have not, a call is made to the routine indicated as SPECPIX in block 174. Once the pixels have all been processed, exit is made from the program.

The SPECPIX program is shown in more detail in FIG. 8b. The first question asked, in block 176, is whether the pixel under consideration is a hair pixel. If it is, no processing is performed. If it is not, the routine HAIRPIX (178) is executed eight times in succession, to obtain the color levels of the eight adjacent pixels, i.e. adjacent vertically, horizontally and diagonally. If none or the adjacent pixels is a hair pixel, as determined in block 180, exit is made from the program. If at least one of them is a hair pixel, the color levels of the nine pixels are averaged, as shown in block 182, and the results are stored as a new blended value for the pixel under consideration, as shown in block 184.

The HAIRPIX routine is shown in detail in FIG. 8c. It performs some of the same functions as the OVERPIC program that combines the style and customer images. First the addresses of the specific pixel in the customer image and in the hairstyle are calculated, as indicated at 186, and for each adjacent pixel questions are posed in blocks 188, 190 and 192 to determine whether the hair pixel or the face pixel should be returned for blending. The face pixel is used if the hair pixel is pure white, or if the identifying bit in the hair pixel is not set (meaning "fill" hair) and the identifying bit in the face is set (meaning that the pixel is in the face area). If the identifying bit in the hair pixel is set (meaning real hair), or neither identifying bit is set (meaning "fill" hair but not in the face area), then the hair pixel is used. Basically, these steps reconstruct the adjacent pixels of the composite image.

The overall effect of the color blending operation is to process each pixel in the composite image, and to conditionally replace its color levels with averages obtained from the pixel itself and the eight adjacent pixels. This averaging is performed on every pixel that is not a hair pixel, so long as at least one of the eight adjacent pixels is a hair pixel, i.e. either real or "fill" hair. As presently implemented, the averaging process is performed on the pixels of the original composite image, prior to blending. In other words, when one or more pixels have been averaged, the new average values are not used in the averaging of subsequently processed pixels.

As presently implemented, the blending function is a menu selectable one. However, it could easily be made automatic instead, and performed each time the composite image is formed for display.

Overall Software Organization

The software organization employed is not critical to the inventive concepts described in this specification and is, therefore, not described in any detail. Basically, the software is organized into a conventional menu-driven structure. That is to say, the user or operator initiates desired functions by selecting appropriate items from a number of menus. Style preparation is performed, as described, using a standard graphics editing software package, although this package could also be integrated within a single menu structure if desired. The other functions, such as color conversion, size and position adjustments, style selection, blending and so forth are all selected from a menu and sub-menus. The OVERPIC program for combining the style and customer images is executed automatically each time a new style is selected, and each time a style is adjusted in any respect, whether in size, position or color. After each such adjustment, the blend function is usually repeated to ensure that the boundaries between the face and the hair are smoothed out.

For completeness, a copy of the listing of the software for performing the functions described in this specification is included as an appendix. The listing represents the entire program, except the TIPS program used to edit the model hairstyles, and is written in the Computer Innovations C86 C compiler language for execution on Microsoft DOS compatible computers.

Conclusion

It will be appreciated from the foregoing that the present invention represents a significant advance in the field of graphics systems. In particular, the invention provides a novel technique for combining two video images into a composite image that has a natural appearance, and permits the adjustment of one of the original images in color, size, position, and so forth. In terms of its application to hairstyling, the invention provides a novel method of combining a customer image with a selected hairstyle image in such a manner that the composite image has a very natural appearance, which may be further modified as desired.

It will also be appreciated that, although an embodiment of the invention has been described in detail for purposes of illustration, various modifications may be made without departing from the spirit and scope of the invention. In particular, although the invention has been described for use in displaying portrait images of hairstyles, the same principles may be adapted to provide multiple views of the sides and rear of the hairstyle, or to provide a rotatable three-dimensional view. Moreover, the invention is not limited to women's hairstyles, and may be used for the styling of moustaches and beards as well as hair. It will also be apparent that similar techniques could be applied to the modeling of clothing. Accordingly, the invention is not to be limited except as by the appended claims.

We claim:

1. A method for displaying hairstyle images on a video image of a customer's face, comprising the steps of:
   capturing the video image of at least one hairstyle;
   processing the captured video image of the hairstyle to render it adaptable to a variety of face sizes and shapes;
   capturing the video image of a customer's face; and
   combining the video image of the hairstyle with the video image of the customer's face, in such a manner that the hairstyle image fits naturally about the face image;
   wherein the step of processing the hairstyle image is performed only once for each captured hairstyle, and includes adding "fill" hair to the hairstyle video image in a region covering a range of size and shape adjustability; and wherein
   the step of combining the hairstyle video image and the customer's face image includes automatically deleting "fill" hair that would otherwise cover the customer's face image, whereby the hairstyle video image is combined with the customer's face image without unnatural gaps between the customer's face image and the hairstyle image, without unnaturally overlaying the hairstyle image over the customer'face image, and without the need of operator intervention.

2. A method as defined in claim 1, and further comprising the steps of:
moving the hairstyle image with respect to the face image; and
repeating the combining step to be sure that the image have combined without unnatural gaps or overlaying of hair on the face.

3. A method as defined in claim 1, and further comprising the steps of:
changing the color of the hairstyle image to a selected different color; and
repeating the combining step to be sure that the images have combined without unnatural gaps or overlaying of hair on the face.

4. A method as defined in claim 1, and further comprising the step of:
blending the colors of the hair and face images in a region close to a line where the hair and face images meet.

5. A method as defined in claim 4, wherein:
the blending step is performed immediately after the combining step.

6. A method for displaying hairstyle images on a video image of a customer's face, comprising the steps of:
capturing the video images of a plurality of hairstyles;
processing the captured video images of the hairstyles to render them adaptable to a variety of face sizes and shapes, and to include a variety of color versions;
capturing the video image of a customer's face;
selecting one of the hairstyles of which the video images have been captured and processed; and
combining the video image of the selected hairstyle with the video image of the customer's face, in such a manner that the hairstyle image fits naturally about the face image;
wherein the step of processing the hairstyle images is performed only once for each captured hairstyle, and includes adding "fill" hair to each said selected hairstyle image in a region covering a region of size and shape adjustability;
and wherein the step of combining the selected hairstyle image and the face image includes automatically deleting "fill" hair that would otherwise cover the face image, whereby the hairstyle image is combined with the face image without unnatural overlaying the hairstyle over the face, and without the need or operator intervention.

7. A method as defined in claim 6, and further comprising the step of:
blending the colors of the hair and face images in a region close to a line where the hair and face images meet.

8. A method as defined in claim 7, wherein:
the blending step is performed immediately after the combining step.

9. A method for displaying hairstyle images on a video image of a customer's face, comprising the steps of:
capturing the video image of at least one hairstyle;
processing the captured video image of the hairstyle to render it adaptable to a variety of face sizes and shapes;
capturing the video image of a customer's face; and
combining the video image of the hairstyle with the video image of the customer's face, in such a manner that the hairstyle image fits naturally about the face image;
wherein the step of processing the hairstyle image includes adding "fill" hair to the hairstyle video image in a region covering a range of size and shape adjustability;
and wherein the step of combining the hairstyle video image and the customer's face image includes deleting "fill" hair that would otherwise cover the customer's face image, whereby the hairstyle video image is combined with the customer's face image without unnatural gaps between the customer's face image and the hairstyle image and without unnaturally overlaying the hairstyle image over the customer's face image;
and wherein the step of combining the images further includes the following steps performed for corresponding picture elements (pixels) in the two images:
determining whether the hairstyle image pixel is either real hair, "fill" hair, or neither,
determining whether the face image pixel is within the face area,
using the hairstyle pixel in the combined image is the hairstyle pixel is of real hair,
using the hairstyle pixel in the combined image if the hairstyle pixel is of "fill" hair and the face pixel is not within the face area, and
using the face pixel if the hairstyle pixel is of "fill" hair and the face pixel is within the face area, or if the hairstyle pixel is of neither real nor "fill" hair.

10. A method as defined in claim 9 and further comprising and the steps of:
moving the hairstyle image with respect to the face image; and
repeating the combining step to be sure that the images have combined without unnatural gaps or overlaying of hair on the face.

11. A method for displaying hairstyle images on a video image of a customer's face, comprising the steps of:
capturing the video image of at least one hairstyle;
processing the captured video image of the hairstyle to render it adaptable to a variety of face sizes and shapes;
capturing the video image of a customer's face;
combining the video image of the hairstyle with the video image of the customer's face, in such a manner that the hairstyle image fits naturally about the face image; and
blending the colors of the hair and face images in a region close to a line where the hair and face images meet, wherein the step of blending includes
selecting a face pixel immediately adjacent to a hair pixel,
for each primary color, determining the average primary color intensity for the selected pixel and for all pixels adjacent to the selected pixel, provided at least one of the adjacent pixels is a hair pixel,
replacing the primary color intensities indicative of the color of the selected pixel with the averaged values of primary color intensities, and
repeating these steps of to lend the color of all face pixels adjacent to a hair pixel;
wherein the step of processing the hairstyle image includes adding "fill" hair to the hairstyle video image in a region covering a range of size and shape adjustability;

and wherein the step of combining the hairstyle video image and the customer's face image includes deleting "fill" hair that would otherwise cover the customer's face image, whereby the hairstyle video image is combined with the customer's face image without unnatural gaps between the customer's face image and the hairstyle image and without unnaturally overlaying the hairstyle image over the customer's face image.

12. A method for displaying hairstyle images on a video image of a customer's face, comprising the steps of:

capturing the video images of a plurality of hairstyles;

processing the captured video images of the hairstyles to render them adaptable to a variety of face sizes and shapes, and to include a variety of color versions;

capturing the video image of a customer's face;

selecting one of the hairstyles of which the video images have been captured and processed; and combining the video image of the selected hairstyle with the video image of the customer's face, in such a manner that the hairstyle image fits naturally about the face image;

wherein the step of processing the hairstyle images includes adding "fill" hair to each said selected hairstyle image in a region covering a range of size and shape adjustability;

and wherein the step of combining the selected hairstyle image and the face image includes deleting "fill" hair that would otherwise cover the face image, whereby the hairstyle image is combined with the face image without unnatural gaps between the face and the hairstyle and without unnaturally overlaying the hairstyle over the face;

and wherein the step of combining the images further includes the following steps performed for corresponding picture elements (pixels) in the two images:

determining whether the hairstyle image pixel is either real hair, "fill" hair, or neither, determining whether the face image pixel is within the face area, using the hairstyle pixel in the combined image if the hairstyle pixel is of real hair, using the hairstyle pixel in the combined image if the hairstyle pixel is of "fill" hair and the face pixel is not within the face area, and using the face pixel if the hairstyle pixel is of "fill" hair and the face pixel is within the face area, or if the hairstyle pixel is of neither real nor "fill" hair.

13. A method as defined in claim 12, and further comprising the steps of:

moving the hairstyle image with respect to the face image; and repeating the combining step to be sure that the images have combined without unnatural gaps or overlaying of hair on the face.

14. A method as defined in claim 12, and further comprising the steps of:

changing the color of the hairstyle image to a selected different color; and repeating the combining step to be sure that the images have combined without unnatural gaps or overlaying of hair on the face.

15. A method as defined in claim 14, wherein the step of changing the color of the hairstyle image including the steps of:

determining for the desired hair color a target average color intensity level for each primary color;

determining for the selected hair color an average color intensity level for each primary color;

determining for each primary color a multiplier value and an offset value, which, when applied to the selected hair average color intensity level will result in the target average color intensity level;

applying the multiplier and offset values to the primary color intensity levels of each of the pixels making up the hairstyle image;

wherein the foregoing steps are performed for a plurality of selectable hairstyles, as part of the step of processing the captured video images of the hairstyles.

16. A method for displaying hairstyle images on a video image of a customer's face, comprising the steps of:

capturing the video images of a plurality of hairstyles;

processing the captured video images of the hairstyles to render them adaptable to a variety of face sizes and shapes, and to include a variety of color versions;

capturing the video image of customer's face;

selecting one of the hairstyles of which the video images have been captured and processed;

combining the video image of the selected hairstyle with the video image of the customer's face, in such a manner that the hairstyle image fits naturally about the face image; and blending the colors of the hair and face images in a region close to a line where the hair and face images meet, wherein the step of bending includes selecting a face pixel immediately adjacent to a hair pixel, for each primary color, determining the average primary color intensity for the selected pixel and for all pixels adjacent to the selected pixel, provided at least one of the adjacent pixels in a hair pixel, replacing the primary color intensities indicative of the color of the selected pixel with the averaged values of primary color intensities, and repeating these steps to blend the color of all face pixels adjacent to a hair pixel;

and wherein the step of processing the hairstyle image includes adding "fill" hair to each said selected hairstyle image in a region covering a range of size and shape adjustability;

and wherein the step of combining the selected hairstyle image and the face image includes deleting "fill" hair that would otherwise cover the face image, whereby the hairstyle image is combined with the face image without unnatural gaps between the face and the hairstyle and without unnaturally overlaying the hairstyle over the face.

17. A method for displaying hairstyle images on a video image of a customer's face, comprising the steps of:

capturing the video image of at least one hairstyle;

predefining the hairstyle image to include "real" hair portions and "fill" hair portions;

processing the captured video image of the hairstyle to render it adaptable to a variety of face sizes and shapes;

capturing the video image of a customer's face;
predefining the video image of the customer's face to include a "face area" portion that must not be dominated by "fill" hair elements of the hairstyle image; and
combining the video image of the hairstyle with the video image of the customer's face, in such a manner that the hairstyle image fits naturally about the face image;
wherein the step of processing the hairstyle image includes adding "fill" hair to the hairstyle video image in a region covering a range of size and shape adjustability;
and wherein the step of combining the hairstyle video image and the customer's face image includes deleting "fill" hair that would otherwise cover the customer's face image, whereby the hairstyle video image is combined with the customer's face image without unnatural gaps between the customer's face image and the hairstyle image and without unnaturally overlaying the hairstyle image over the customer's face image;
and wherein the step of combining the hairstyle image and the customer face image further includes displaying the "real" hair image in preference to corresponding elements of the face image,
displaying the "face area" image in preference to corresponding elements of the "fill" hair, and
displaying the "fill" hair image if not within corresponding elements of the "face area".

18. A method for displaying hairstyle images on a video image of a customer's face, comprising the steps of:
capturing the video images of a plurality of hairstyles;
predefining the hairstyle images to include "real" hair portions and "fill" hair portions;
processing the captured video images of the hairstyles to render them adaptable to a variety of face sizes and shapes, and to include a variety of color versions;
capturing the video image of a customer's face;
predefining the video image of the customer's face to include a "face area" portion that must not be dominated by "fill" hair elements of the hairstyle image;
selecting one of the hairstyles of which the video images have been captured and processed; and
combining the video image of the selected hairstyle with the video image of the customer's face, in such a manner that the hairstyle image fits naturally about the face image;
wherein the step of processing the hairstyle images includes adding "fill" hair to each said selected hairstyle image in a region covering a range of size and shape adjustability;
and wherein the step of combining the selected hairstyle image and the face image includes deleting "fill" hair that would otherwise cover the face image, whereby the hairstyle image is combined with the face image without unnatural gaps between the face and the hairstyle and without unnaturally overlaying the hairstyle over the face;
and wherein the step of combining the hairstyle image and the customer face image further includes displaying the "real" hair image in preference to corresponding elements of the face image,
displaying the "face area" image in preference to corresponding elements of the "fill" hair, and
displaying the "fill" hair image is not within corresponding elements of the "face area."

* * * * *